United States Patent
Wijffels et al.

(10) Patent No.: US 8,103,411 B2
(45) Date of Patent: Jan. 24, 2012

(54) ELECTRIC POWER ASSISTED STEERING YAW DAMPING METHOD

(75) Inventors: Lodewijk Wijffels, Aachen (DE); Anja Damman, Waldfeucht (DE); Oliver Nehls, Aachen (DE); Sergio Codonesu, Heerlen (NL)

(73) Assignee: Ford Global Technologies, Dearborn, MI (US)

( * ) Notice: Subject to any disclaimer, the term of this patent is extended or adjusted under 35 U.S.C. 154(b) by 782 days.

(21) Appl. No.: 12/233,559

(22) Filed: Sep. 18, 2008

(65) Prior Publication Data

US 2009/0082925 A1 Mar. 26, 2009

(30) Foreign Application Priority Data

Sep. 21, 2007 (DE) .......................... 10 2007 045 211

(51) Int. Cl.
*B62D 6/00* (2006.01)
(52) U.S. Cl. .............................. 701/42; 701/41; 180/443
(58) Field of Classification Search .................... 701/41, 701/42; 180/443, 444, 446
See application file for complete search history.

(56) References Cited

U.S. PATENT DOCUMENTS

| | | | |
|---|---|---|---|
| 6,854,559 B2 * | 2/2005 | Kurishige et al. | 180/446 |
| 7,219,761 B2 * | 5/2007 | Fukuda et al. | 180/444 |
| 2005/0189163 A1 * | 9/2005 | Barton et al. | 180/446 |
| 2006/0069481 A1 * | 3/2006 | Kubota et al. | 701/41 |
| 2007/0239333 A1 * | 10/2007 | Galkowski et al. | 701/41 |
| 2007/0273317 A1 * | 11/2007 | Endo et al. | 318/432 |
| 2008/0294313 A1 * | 11/2008 | Aoki et al. | 701/43 |
| 2009/0043443 A1 * | 2/2009 | Wei et al. | 701/29 |
| 2009/0192679 A1 * | 7/2009 | Kobayashi et al. | 701/42 |
| 2010/0286871 A1 * | 11/2010 | Kobayashi et al. | 701/41 |

FOREIGN PATENT DOCUMENTS

DE  60213215 T2  7/2007

* cited by examiner

*Primary Examiner* — Khoi Tran
*Assistant Examiner* — Jason Holloway
(74) *Attorney, Agent, or Firm* — Angela M. Brunetti; Fredrick Owens

(57) ABSTRACT

The invention relates to a method and an apparatus for electrically controlled assistance to a vehicle. In order to stabilize a vehicle in the event of oversteering, the invention provides that a nominal yaw damping torque is determined and is multiplied by an oversteer signal such that an additional torque is produced which is added, via an actuator in an electrically assisted power steering system, to its nominal torque, and is introduced into a vehicle steering system.

12 Claims, 2 Drawing Sheets

ELECTRIC POWER ASSISTED STEERING YAW DAMPING METHOD

CROSS REFERENCE

The inventive subject matter is a continuation of foreign filed application DE 102007045211.1, filed Sep. 21, 2007, whose subject matter is incorporated herein by reference and provides the basis for a claim of priority of invention under 35 U.S.C. §119.

TECHNICAL FIELD

The inventive subject matter is directed to an electric power assisted steering system and more particularly to a system and method for yaw damping using an electric power assisted steering system.

BACKGROUND

Methods and apparatuses for electrically controlled assistance to a vehicle movement are generally known and are widely used in modern motor vehicles. By way of example, one driving assistance system in a motor vehicle is an electronic stability management system, ESP. In this system, the brakes and engine in the motor vehicle can normally be operated in a suitable manner to keep the motor vehicle in a stable driving state or to bring it to a stable driving state from an unstable driving state.

The driving assistance system is supplied with motor vehicle states, determined by various sensors, and/or the driving motion of the motor vehicle, as input variables. Output variables are determined from these input variables in order to control actuators which can act on the driving movement of the motor vehicle, for safety purposes. Intended values to be achieved for the characteristic variables of the vehicle movement are normally predetermined for the driving assistance system. Compliance with these intended values ensures that the motor vehicle is driving in a stable state. In this case, it is important for these intended values to be predetermined correctly and exactly in order that the driving assistance system can set the stable driving behavior of the motor vehicle safely, quickly and reliably.

By way of example, one undesirable driving movement is oversteering of the motor vehicle. Oversteering of a vehicle is defined as the situation when the slip angle of the rear wheels of the vehicle is greater than the slip angle of the front wheels. This means that the rear of the vehicle breaks away, that is to say it slides outwards in a curve. The expression "oversteering" is also used to characterize the natural steering behavior of vehicles. The opposite behavior is referred to as understeer. The natural tendency of a vehicle to try to "turn more" than has been selected on the steering wheel is in principle regarded as being less safe than understeering.

When a vehicle starts to oversteer or understeer, the vehicle can, for example, be stabilized by means of an appropriate steering action by the driver, for example by the driver steering in the opposite direction. Opposite steering requires a certain amount of practice. Inappropriate opposite steering by inexperienced drivers can, in some cases, cause accidents with considerable personal injuries. There is a need for a method and an apparatus which make it possible to achieve safe stabilization of the vehicle in the event of oversteer, or at the onset of oversteer.

SUMMARY

The method and system of the inventive subject matter determines a nominal yaw damping torque which is multiplied by an oversteer signal such that an additional torque or torque signal is produced and added, via an actuator for EPAS control, to its nominal torque and is introduced into a vehicle steering system to compensate for oversteer.

DESCRIPTION OF DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DESCRIPTION OF INVENTION

While various aspects of the present invention are described with reference to a particular illustrative embodiment, the invention is not limited to such embodiments, and additional modifications, applications, and embodiments may be implemented without departing from the present invention.

Figure 1:
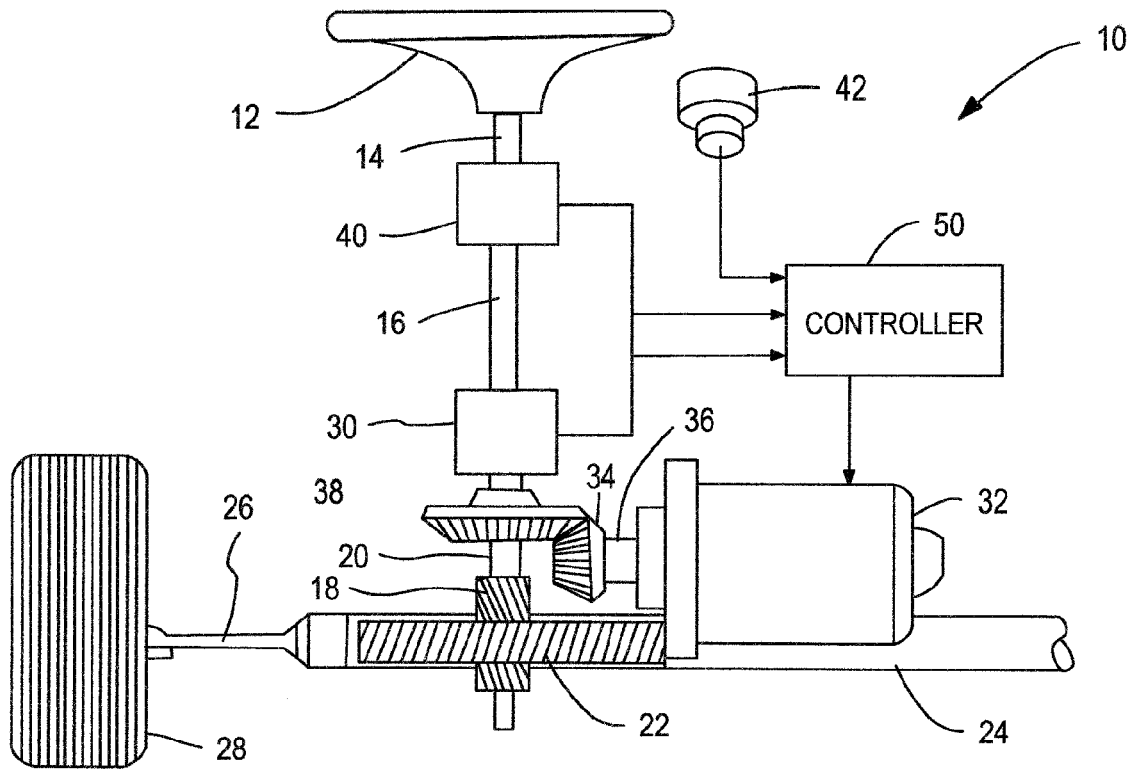
FIG. 1 is an electrical power steering system.

Referring to FIG. 1, an electrically assisted power steering system 10 includes a steering wheel 12 attached to a first end 14 of a steering shaft 16. A steering pinion gear 18, attached to a second end 20 of the steering shaft 16 opposite the first end 14, engages a steering rack gear 22 of a steering rack 24. Each end of the steering rack 24 includes a tie rod 26 attached to a steerable wheel and tire assembly 28 in a conventional manner. A steering torque sensor 30 is incorporated in the steering shaft 16 for detecting a steering torque applied by an operator to the steering shaft 16 by way of the steering wheel 12. A steering wheel angle sensor 40 senses a steering wheel angle. An electric motor 32 includes an output gear 34 mounted on an output shaft 36 for drivingly engaging an assist input gear 38 mounted on the steering shaft 16. Alternatively, the electric motor may have its output shaft and an output gear arranged to directly engage the steering rack. A controller 50 receives signals representative of the torque of the steering shaft 16 between sensors 30 and 40. The electric motor may be a DC brush or brushless motor. It may utilize a three-phase alternating current induction motor. It should be noted that a variable reluctance motor may be substituted for the inductance motor without impacting the performance of the inventive subject matter. Induction and variable reluctance motors are typically used in electrically assisted power steering systems because of their low friction and high torque-to-inertia ratio compared to larger electric motors.

Figure 2:
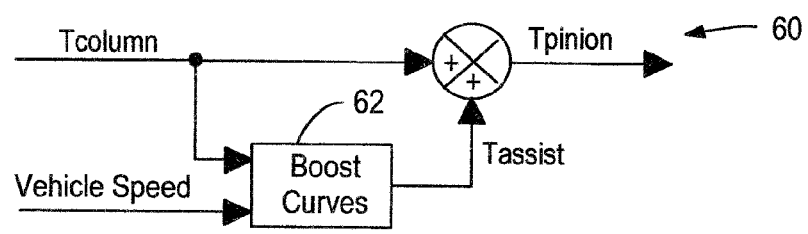
FIG. 2 is a block diagram of torques represented in a typical electric power steering system.

FIG. 2 is a block diagram of a typical electric power steering system 60. In a typical electric power steering system 60, vehicle speed, $V_s$, and steering column torque, $T_{column}$, signals are used, along with boost curves a 62 to determine the amount of assist torque, $T_{assist}$ required to aid the driver in steering the vehicle. The assist torque, $T_{assist}$, is carried out by the electric motor, (see FIG. 1).

In the situation where vehicle oversteering is identified, for example by the actual yaw acceleration being compared with an intended yaw acceleration, the additional torque or torque assist signal is advantageously produced, and is introduced into the steering system via the actuator for power assisted steering. This introduced torque indicates to the driver the direction in which he should steer in order to stabilize the vehicle. At the same time, this allows incorrect driver steering movements to be damped.

By way of example, oversteering can be identified by means of suitable sensors which transmit their signals to a controller in the vehicle. The actual yaw acceleration of the vehicle is advantageously determined first, by filtering and smoothing the measured yaw rate of the vehicle. The actual yaw acceleration or the corresponding signal is supplied to a transfer function, for example a "look-up table", such that the nominal yaw damping torque can be determined by means of empirical values which are stored in the transfer function The nominal yaw damping torque or its corresponding signal can be scaled taking account of other measured or estimated values or signals which indicate a vehicle state, such as the vehicle speed, steering wheel angle, steering wheel torque, etc.

In the case of EPAS (Electric Power Assisted Steering) systems, for example, the magnitude of an EPAS force is dependent on the measured steering wheel torque (that is to say as perceived by the driver). The relationship between the two can be defined by a boost curve. The invention is used to calculate a delta torque demand (additional torque) for the EPAS actuator. When the EPAS actuator generates this delta torque (additional torque), the result is a change in the measured steering wheel torque (=driver torque=EPAS torque+ delta torque+ . . . ). The profile of the EPAS-force curve is normally non-linear. When the steering wheel torque is low (for example when traveling straight ahead, steering central (on-center steering)), the boost curve has a flat profile. This means that the delta torque demand (additional torque) does not change the magnitude of the EPAS torque (virtually). The driver will therefore perceive the majority of the demanded delta torque (additional torque). In this exemplary situation, the EPAS force has a magnitude of zero. When the additional torque is demanded, the steering wheel torque changes by precisely the magnitude of the additional torque. The steering wheel torque is used to determine the EPAS force in this situation. If the boost curve has a flat profile, the magnitude of the EPAS force will not change, so that the driver will perceive all the additional torque.

This can be expressed by the following formula:

Steering wheel torque (rising)~Additional torque (rising)−EPAS force (unchanged) (1)

When the steering wheel torques are greater (for example when turning, also referred to as off-center steering), the boost curve in contrast has a steep profile. This means that the delta torque demand (additional torque) changes the magnitude of the EPAS torque (because of the change in the steering wheel torque). The driver will therefore perceive only a small proportion of the required delta torque (of the additional torque). In this exemplary situation, the EPAS force already has a certain magnitude. When the additional torque is demanded, the steering wheel torque will change. If the boost curve has a steep profile, the direct relationship with the steering wheel torque results in the EPAS force changing at the same time. Since the EPAS force is changing, the steering wheel torque changes by an amount which is less than the amount of the additional torque.

This can be expressed by the following formula:

Steering wheel torque (rising less)~Additional torque (rising)−EPAS force (rising) (2)

However, this results in the yaw damping algorithm having a non-linear response. If, for example, a delta torque demand (an additional torque) is produced with the same intensity or with the same magnitude both during on-center steering and during off-center steering, the driver will perceive a greater torque offset during on-center steering than during off-center steering. In order to compensate for this (undesirable) effect, it is possible for the scaled nominal yaw damping torque (scaled nominal yaw damping torque) to be supplied to a block in which an inverse boost curve is stored, in order to estimate how much of the demand (of the additional torque) could be canceled out by the boost curve. A scaled and compensated signal is therefore produced for the nominal yaw damping torque; that is to say the yaw damping algorithm in consequence has a linear response.

Finally, the scaled and compensated signal (nominal yaw damping torque) is multiplied by the oversteer signal. The oversteer signal or its multiplier has a magnitude of between 0 and 1. The multiplier results in smooth activation and deactivation, that is to say continuously variable production of the additional torque as an output signal. The oversteer signal is produced by supplying measured vehicle state signals as input signals to a target yaw generator. The target yaw generator is connected to a block to identify oversteering, within which the oversteer signal is produced. The oversteer signal is processed in a processing block to form the multiplier, so that the oversteer signal has a magnitude of between 0 and 1, as the multiplier for the scaled and optionally compensated nominal yaw damping torque.

The output signal or the additional torque is finally added to the nominal actuator torque. This also includes, of course, other signals, which are required for the electrical power assisted steering system (EPAS).

However, it is also possible, instead of producing a scaled and compensated signal for the nominal yaw damping torque, to supply the additional torque to a block in which an inverse boost curve is stored, such that an output signal that is produced is added as a scaled and compensated additional torque to the nominal actuator torque. In this case, the scaled nominal yaw damping torque can be multiplied directly by the oversteer signal, thus producing an additional torque. This signal can then be supplied to the block in which the inverse boost curve is stored, in order to estimate how much of the demand (of the additional torque) could be canceled out by the boost curve.

The object according to the invention is achieved by the part relating to the apparatus in which a circuit is provided which can be implemented in a controller in the vehicle, with a nominal yaw damping torque being determined and being multiplied by an oversteer signal, such that an additional torque or torque signal is produced which is added, via an actuator for EPAS steering, to its nominal torque, and is introduced into a vehicle steering system. Overall, a yaw damping torque is advantageously provided which, as a result of the way in which it is produced according to the invention, can assist the driver to steer the vehicle in the "correct" direction in the case of oversteering, in order to stabilize the vehicle.

Figure 3:
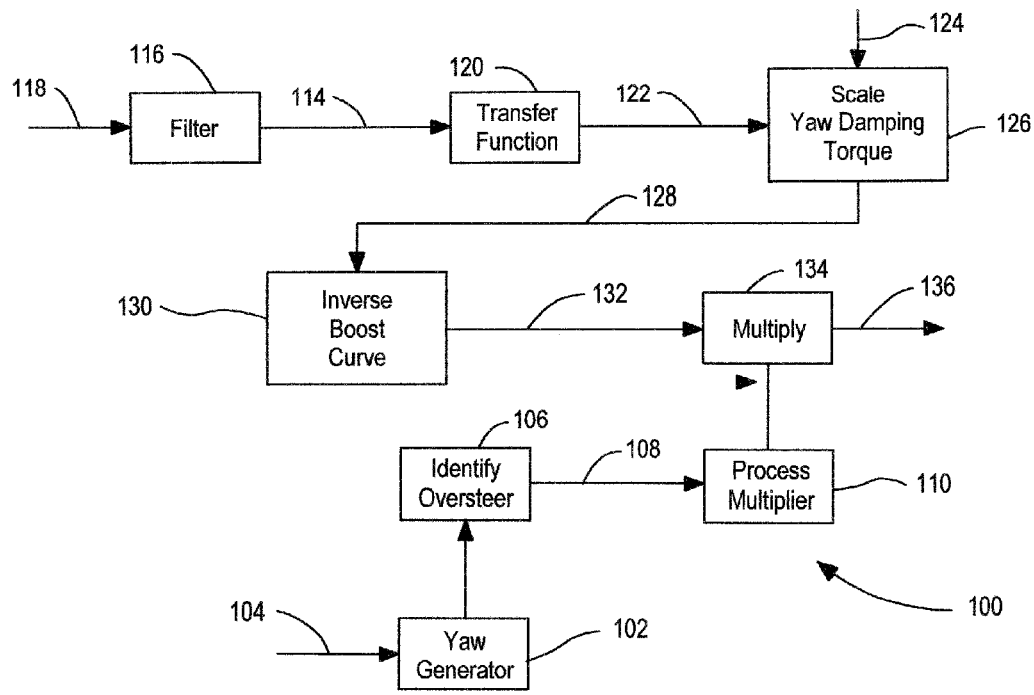
FIG. 3 is a block diagram of an algorithm, which may be implemented as a circuit in a controller, for determining a resetting torque according to the inventive subject matter.

FIG. 3 shows a circuit and/or an algorithm 100 for yaw damping by way of the electrically assisted power steering system. The algorithm 100 can be implemented in a controller, which is not illustrated, in the vehicle, or may be a circuit configuration within the system. A target yaw generator 102 receives measured vehicle states as input signals 104. The measured vehicle states are provided by various systems already implemented on the vehicle, such as ESP and EPAS systems for example.

The target yaw generator 102 is connected to an oversteering identification block 106, to identify oversteering. When oversteering has been identified 106, an oversteer signal 108 is produced, and is processed 110 to form a multiplier 112. The multiplier 112 has a magnitude of between 0 and 1, depending on the strength of the identified oversteer signal.

A yaw acceleration 114 is determined by filtering and smoothing 116 a measured yaw rate 118. The yaw acceleration 114 is supplied as an input signal to a transfer function 120, for example to a so-called "look-up table", thus resulting in a nominal yaw damping torque 122 being produced. The nominal yaw damping torque 122 can be scaled taking into account other measured and/or estimated signals 124, such as the vehicle speed, steering wheel angle, steering wheel torque etc., and this can be done in the block 126. A scaled nominal yaw damping torque 128 is produced as the output signal. As can also be seen from FIG. 3, the signal, as scaled in the block 126, of the nominal yaw damping torque 122 is supplied to a stored inverse boost curve 130, in order to produce a scaled and compensated signal 132 for the nominal yaw damping torque 122.

This is multiplied 134 by the multiplier 112 such that an additional torque or torque signal 136 is produced, which is added, via an actuator for EPAS steering, to its nominal torque, and is introduced into a vehicle steering system.

The target yaw generator 102 is therefore advantageously connected to the oversteer identification process 106, in order to determine vehicle states. An example of a state which may be identified is a state in which the vehicle has a neutral or understeer response. In this case, the nominal yaw damping torque for the electrically power assisted steering (EPAS) is branded inoperative, which means that the multiplier 112 has a magnitude of zero, as a result of which the torque demand is also zero. Another example is the state in which the vehicle oversteers. In this case, the yaw damping is initiated, which means that the additional torque 136 is produced, with the multiplier 112 for the nominal yaw damping torque 122 or 128 having a magnitude between 0 and 1.

The additional torque 136 is introduced via the actuator for the electric motor in the EPAS system, so that the driver perceives assistance. The driver can use this assistance to steer the vehicle in the correct direction, in order to stabilize the vehicle by counteracting oversteering.

Figure 4:
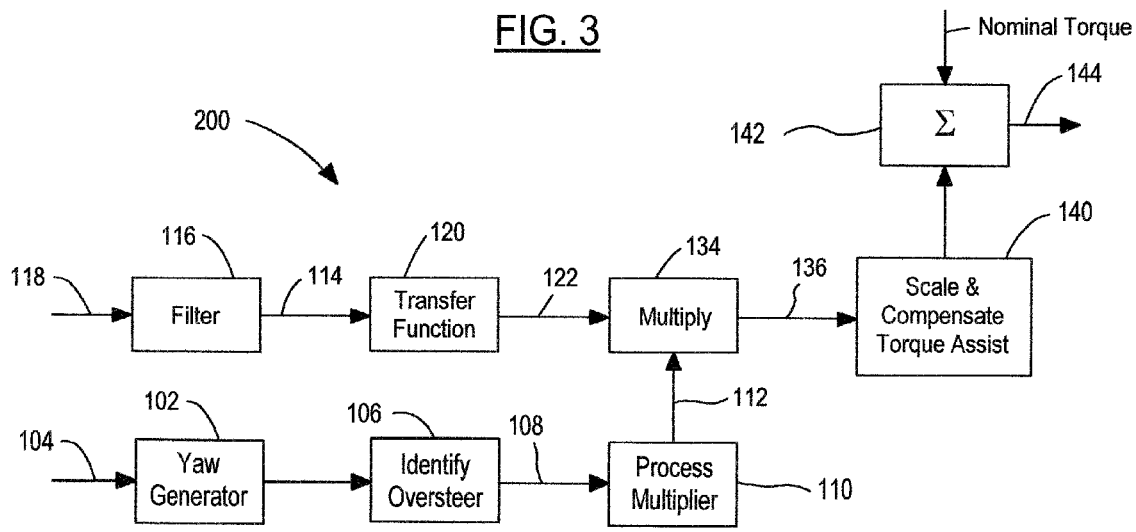
FIG. 4 is a block diagram of an algorithm, which may be implemented as a circuit in a controller, for determining a resetting torque according to another embodiment of the inventive subject matter.

In another embodiment 200 shown in FIG. 4, the yaw damping torque signal 122 may be multiplied 134 by the multiplier 112 directly, dispensing with the need to apply the inverse boost curve. The additional torque 136 that is produced can then be supplied to a stored inverse boost curve 140, in order to produce a scaled and compensated signal for the additional torque. The additional torque would then be added 142, via an actuator for EPAS steering, to its nominal torque, and introduced 144 into the vehicle steering system.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A method for controlling oversteer in a vehicle equipped with an electrically assisted power steering system, the method comprising the steps of:
   inputting measured vehicle states to a controller in the steering system;
   generating a target yaw signal;
   measuring an actual yaw acceleration;
   comparing the target yaw signal and the actual yaw acceleration signal to determine an oversteer condition;
   generating an oversteer signal upon determination of the oversteer condition;
   processing the oversteer signal to produce a multiplier;
   applying a transfer function to the actual yaw acceleration signal to derive a nominal yaw damping torque;
   scaling the nominal yaw damping torque using predetermined vehicle state signals to derive a scaled nominal yaw damping torque;
   applying the multiplier to the scaled nominal damping torque to derive an added torque signal; and
   summing the added torque signal with a torque assist signal for the electrically assisted power steering system, thereby controlling oversteer in the vehicle.

2. The method as claimed in claim 1 wherein the step of applying a transfer function to the actual yaw acceleration signal further comprises the transfer function comprising stored empirical values.

3. The method as claimed in claim 1 wherein the step of scaling the nominal yaw damping torque further comprises applying a stored inverse boost curve to produce a scaled and compensated nominal yaw damping torque.

4. A method for controlling oversteer in a vehicle equipped with an electrically assisted power steering system, the method comprising the steps of:

inputting measured vehicle states to a controller in the steering system;
generating a target yaw signal;
measuring an actual yaw acceleration;
comparing the target yaw signal and the actual yaw acceleration signal to determine an oversteer condition;
generating an oversteer signal upon determination of the oversteer condition;
applying a transfer function to the actual yaw acceleration signal to derive a nominal yaw damping torque;
multiplying the nominal damping torque by the oversteer signal to derive an added torque signal;
scaling the added torque signal using predetermined vehicle state signals; and
summing the scaled added torque signal with a nominal torque assist signal for the electrically assisted power steering system, thereby controlling oversteer in the vehicle.

5. The method as claimed in claim 4 wherein the step of applying a transfer function to the actual yaw acceleration signal further comprises the transfer function comprising stored empirical values.

6. The method as claimed in claim 4 wherein the step of scaling the added torque signal further comprises applying a stored inverse boost curve to produce a scaled and compensated added torque signal.

7. A system for controlling oversteer in a vehicle comprising:
a steering wheel;
a steering shaft having a first end attached to the steering wheel and a second end;
a steering pinion gear attached to the second end of the steering shaft;
a steering rack having a steering gear engaged with the steering pinion gear;
a tie rod attached to each end of the steering rack and a steerable wheel and tire assembly;
a torque sensor in the steering shaft;
a steering wheel angle sensor coupled to the steering wheel;
an electric motor for drivingly engaging an assist input gear mounted on the steering shaft;
a controller receiving torque signals from the torque sensor; and
a control circuit in the controller configured to input measured vehicle states to a controller in the steering system, generate a target yaw signal, measure an actual yaw acceleration, compare the target yaw signal and the actual yaw acceleration signal to determine an oversteer condition, generate an oversteer signal upon determination of the oversteer condition, process the oversteer signal to produce a multiplier, apply a transfer function to the actual yaw acceleration signal to derive a nominal yaw damping torque, scale the nominal yaw damping torque using predetermined vehicle state signals to derive a scaled nominal yaw damping torque, apply the multiplier to the scaled nominal damping torque to derive an added torque signal, and sum the added torque signal with a torque assist signal for the electrically assisted power steering system, thereby controlling oversteer in the vehicle.

8. The system as claimed in claim 7 wherein the transfer function further comprises stored empirical values.

9. The system as claimed in claim 7 wherein the control circuit further comprises a stored inverse boost curve used in scaling the nominal yaw damping torque to produce a scaled and compensated nominal yaw damping torque.

10. A system for controlling oversteer in a vehicle comprising:
a steering wheel;
a steering shaft having a first end attached to the steering wheel and a second end;
a steering pinion gear attached to the second end of the steering shaft;
a steering rack having a steering gear engaged with the steering pinion gear;
a tie rod attached to each end of the steering rack and a steerable wheel and tire assembly;
a torque sensor in the steering shaft;
a steering wheel angle sensor coupled to the steering wheel;
an electric motor for drivingly engaging an assist input gear mounted on the steering shaft;
a controller receiving torque signals from the torque sensor; and
a control circuit in the controller configured to input measured vehicle states to a controller in the steering system, generate a target yaw signal, measure an actual yaw acceleration, compare the target yaw signal and the actual yaw acceleration signal to determine an oversteer condition, generate an oversteer signal upon determination of the oversteer condition, apply a transfer function to the actual yaw acceleration signal to derive a nominal yaw damping torque, multiply the nominal yaw damping torque by the oversteer signal to derive an added torque signal, scale the added torque signal using predetermined vehicle state signals to derive a scaled and compensated added torque signal, and sum the scaled and compensated added torque signal with a torque assist signal for the electrically assisted power steering system, thereby controlling oversteer in the vehicle.

11. The system as claimed in claim 10 wherein the transfer function further comprises stored empirical values.

12. The system as claimed in claim 10 wherein the control circuit further comprises a stored inverse boost curve used in scaling the added torque signal to produce the scaled and compensated added torque signal.

* * * * *